United States Patent
Newell

(10) Patent No.: US 10,661,693 B2
(45) Date of Patent: May 26, 2020

(54) ADJUSTABLE FOOTREST FOR A VEHICLE

(71) Applicant: Thompson Aero Seating Limited, Portadown, Craigavon (GB)

(72) Inventor: Keith Newell, Moneymore (GB)

(73) Assignee: Thompson Aero Seating Limited, Portadown, Craigavon (GB)

(*) Notice: Subject to any disclaimer, the term of this patent is extended or adjusted under 35 U.S.C. 154(b) by 40 days.

(21) Appl. No.: 15/903,121

(22) Filed: Feb. 23, 2018

(65) Prior Publication Data
US 2018/0236919 A1  Aug. 23, 2018

(30) Foreign Application Priority Data
Feb. 23, 2017 (GB) .................................. 1702952.1

(51) Int. Cl.
B60N 3/06 (2006.01)
B64D 11/06 (2006.01)

(52) U.S. Cl.
CPC .............. B60N 3/063 (2013.01); B60N 3/06 (2013.01); B64D 11/0636 (2014.12); B64D 11/0643 (2014.12)

(58) Field of Classification Search
CPC ............................. B60N 3/063; B64D 11/0643
See application file for complete search history.

(56) References Cited

U.S. PATENT DOCUMENTS

| 6,305,644 | B1 | 10/2001 | Beroth | |
| 2006/0006704 | A1* | 1/2006 | Skelly | B60N 2/62 297/188.08 |
| 2008/0143137 | A1* | 6/2008 | Bowen | B60N 2/0232 296/75 |
| 2011/0241374 | A1 | 10/2011 | Graves | |
| 2012/0139322 | A1 | 6/2012 | Wesselink | |
| 2013/0145972 | A1 | 6/2013 | Knox et al. | |

FOREIGN PATENT DOCUMENTS

| DE | 10047739 A1 | 4/2002 |
| DE | 202013009983 U1 | 2/2014 |
| EP | 1116654 A2 | 7/2001 |
| EP | 3075603 A1 | 10/2016 |
| FR | 2798890 A1 | 3/2001 |
| JP | H09301014 A | 11/1997 |
| JP | H10203224 A | 8/1998 |
| WO | 2005077709 A1 | 8/2005 |
| WO | 2006083158 A1 | 8/2006 |

OTHER PUBLICATIONS

Search Report for United Kingdom Patent Application No. GB1702952. 1, dated Aug. 15, 2017, 1 page.
Extended European Search Report for European Patent Application No. 18157003.7, dated Jul. 23, 2018, 9 pages.

* cited by examiner

Primary Examiner — David R Dunn
Assistant Examiner — Tania Abraham
(74) Attorney, Agent, or Firm — Withrow & Terranova, P.L.L.C.

(57) ABSTRACT

A footrest for being supported upon a bulkhead of a vehicle, the footrest comprising a support member comprising a storage compartment for receiving and carrying one or more documents or portable electronic devices and a foot member, wherein the foot member is pivotably coupled to the support member such that the foot member is movable between stowed and deployed states and means for releasably retaining the foot member in the deployed state relative to the support member.

20 Claims, 13 Drawing Sheets

ADJUSTABLE FOOTREST FOR A VEHICLE

RELATED APPLICATIONS

This application claims priority to United Kingdom national application 1702952.1, filed Feb. 23, 2017, the disclosure of which is hereby incorporated herein by reference in its entirety.

FIELD OF THE INVENTION

The present invention relates to an adjustable footrest, in particular to an adjustable footrest including a storage compartment which is suitable for use in aircraft.

BACKGROUND

It is a common feature of passenger vehicles such as planes, trains and boats for example, to have multiple rows of seating arrangements which are positioned in front of one another. These seating arrangements provide a seat to the occupant of that particular seating arrangement however they also provide a number of beneficial features to the occupant of the seating arrangement located there behind. For example it is a common feature of such seating arrangements to incorporate a deployable tray table located upon their rear side which the occupant of the seating arrangement behind may use to support beverages and snacks. A further feature of such seating arrangements is the provision of a footrest which is typically located towards the lower rear portion of the seating arrangement, this allows the occupant of the seat located behind to rest their feet in a comfortable location. Additionally the rear portions of such seating arrangements typically incorporate some form of storage compartment in the form of a holder or netting such that the documents or electronic devices may be held therein for ease of access during transit.

The provision of the features described above is dependent on the presence of a seating arrangement being located in front of one other seating arrangement however this is not always the case, particularly in planes and trains, there are typically a number of bulkheads disposed therein. This means that the occupants of seating arrangements located behind such bulkheads do not have access to the features described above such as a footrest or storage compartment.

It would be desirable to mitigate the problem outlined above.

SUMMARY

Accordingly the present invention provides a footrest for being supported upon a bulkhead of a vehicle, the footrest comprising a support member comprising a storage compartment for receiving and carrying one or more documents or portable electronic devices and a foot member, wherein the foot member is pivotably coupled to the support member such that the foot member is movable between stowed and deployed states and means for releasably retaining the foot member in the deployed state relative to the support member.

Preferably, the support member and foot member are arranged to provide access to the storage compartment when the foot member adopts either stowed or deployed states.

Preferably, the support member comprises an aperture and the foot member comprises a recess, wherein the aperture and recess are arranged to define a channel into the storage compartment when the foot member adopts either stowed or deployed states.

Ideally, the foot member is pivotably coupled to the support member by first and second pivotable coupling parts located at either side of the support member.

Preferably, the means for releasably retaining the foot member in the deployed state relative to the support member comprises a ratchet mechanism configured to retain the foot member in a plurality of deployed positions relative to the support member.

Ideally, the ratchet mechanism is incorporated within the pivotable coupling part(s).

Preferably, the ratchet mechanism comprises at least one support arm which is pivotably coupled to the support member at one end and the foot member at the opposing end.

Ideally, the support arm comprises first and second elongate portions, wherein the first portion is pivotably coupled to the support member at one end and releasably coupled to the second portion at at least one location.

Preferably, the first portion is shaped and dimensioned to define a central aperture with the first portion further comprising a plurality of detents which extend from the body of the first portion into the central aperture, along one side of the central aperture.

Ideally, the second portion is coupled to the first portion at one end and the foot member at the opposing end, wherein the first portion is shaped and dimensioned to define a cavity within which the second portion is disposed, at least in part, with the second portion being extendable from and retractable into the cavity.

Preferably, the second portion comprises a latch which is configured to engage the plurality of detents of the first portion when the second portion is extended relative to the first portion.

Ideally, the support member comprises front and rear walls and opposing side walls and a bottom wall with the storage compartment being defined therebetween, such that the support member is typically substantially cuboidal in shape.

Preferably, the side and bottom walls extend from the confines of body of the front wall, offset from the edges of the front wall with the rear wall extending between the side and bottom walls such that the rear, side and bottom walls are narrower in width than the front wall.

Ideally, the front wall comprises side edges and a bottom edge, the side edges having respective upper and lower portions, with each of the respective upper portions protruding further rearward than the lower portions such as to define respective protrusions upon the side edges which extend rearward from the body of the front wall.

Preferably, wherein said pivotable coupling parts are disposed upon the protrusions.

Optionally, said support member incorporates one or more additional apertures for providing further means of entry to the storage compartment.

Optionally, wherein said footrest comprises securing means which is configured to releasably secure the foot member to the support member in the stowed state.

BRIEF DESCRIPTION OF THE DRAWINGS

An embodiment of the invention will now be described by way of example with reference to the accompanying drawings in which like numerals are used to denote like parts and in which.

DETAILED DESCRIPTION OF THE DRAWINGS

Figure 13:
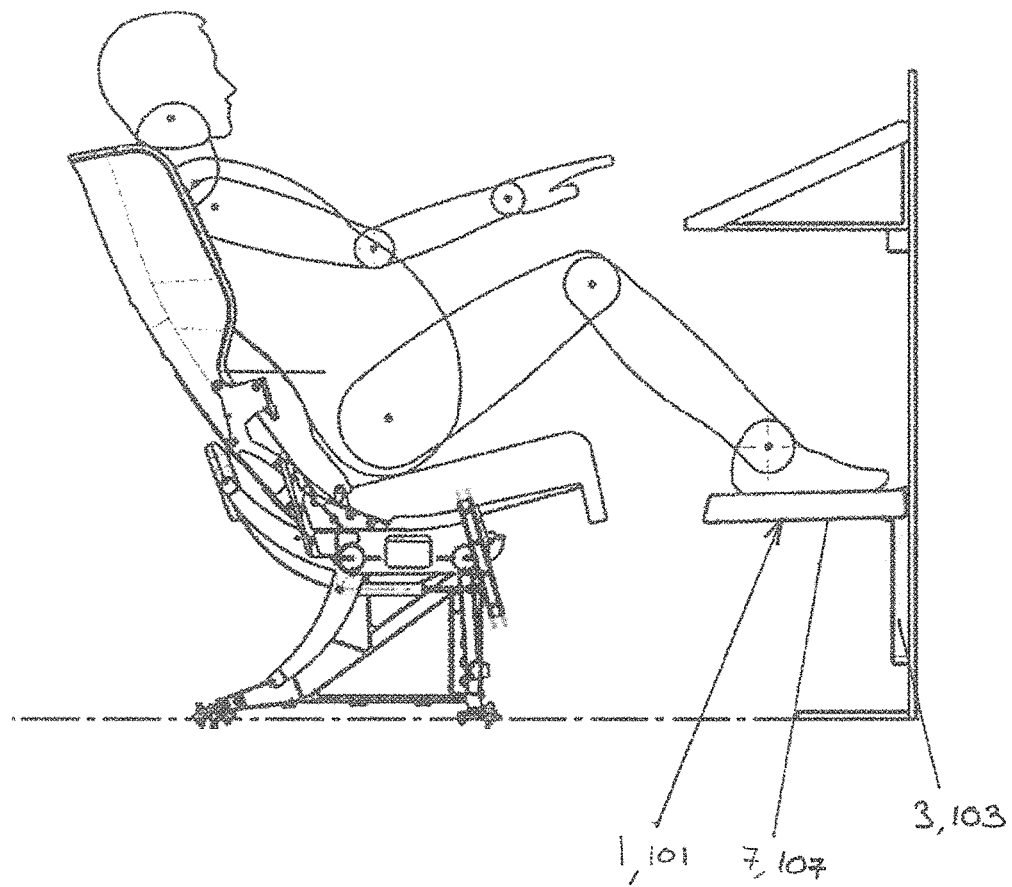
FIG. 13 is a side view of the footrest showing the footrest mounted on a bulkhead with a seating arrangement and seat occupant located rearward of the footrest.

Referring to the drawings and in particular FIGS. 1 to 8, there is shown a first embodiment of a footrest 1 generally indicated by the reference numeral 1. The footrest 1 is suitable for being supported on a wall such as a bulkhead or partition wall of a vehicle such as a plane, train, boat or any other suitable vehicle. The footrest 1 is typically supported upon a wall which is located directly in front of a passenger seating arrangement as shown in FIG. 13, with the seating arrangement being arranged such that the seat occupant faces towards the wall in-use. It should be understood the use of the term "vertical axis" is intended to mean the axis which extends perpendicular to the vehicle floor within which the footrest 1 is disposed in-use. Additionally the term "forward" is intended to mean the direction in which the occupant of the seating arrangement would face in-use, whilst the term "rearward" is intended to mean the opposing direction.

Figure 4:
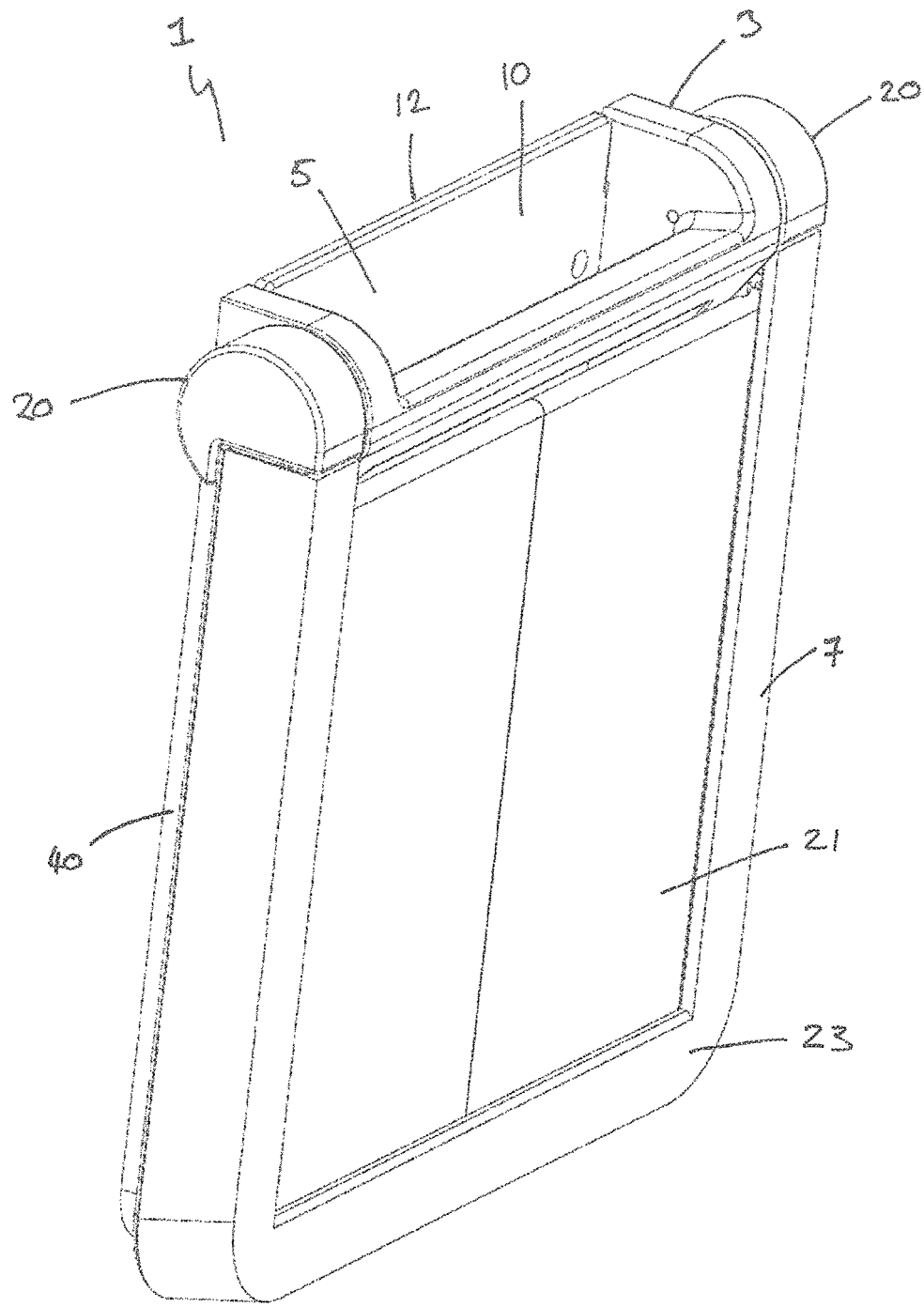
FIG. 4 is a front perspective view of the footrest in the stowed state.
Figure 5:
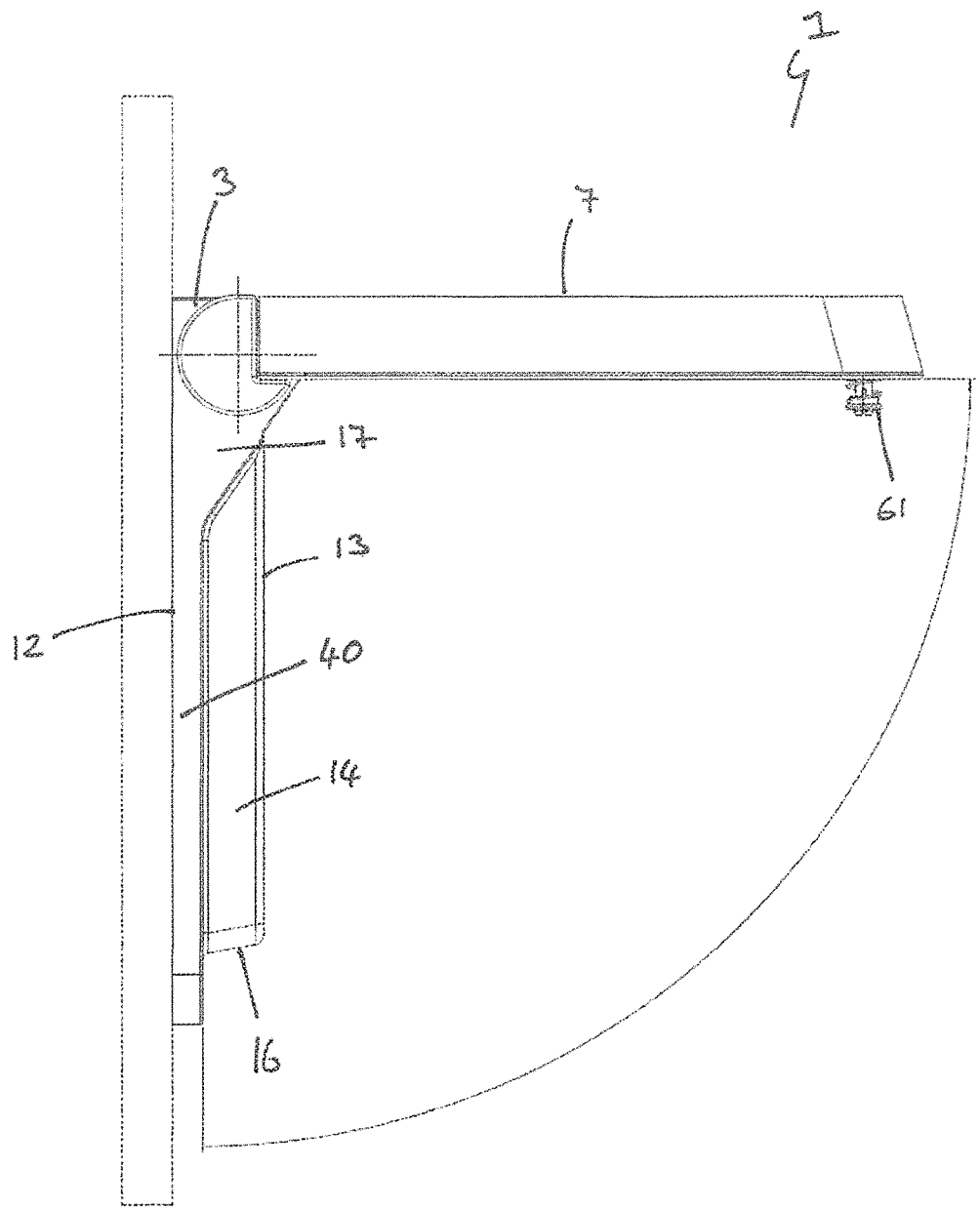
FIG. 5 is a side plan view of the footrest in a deployed state.
Figure 6:
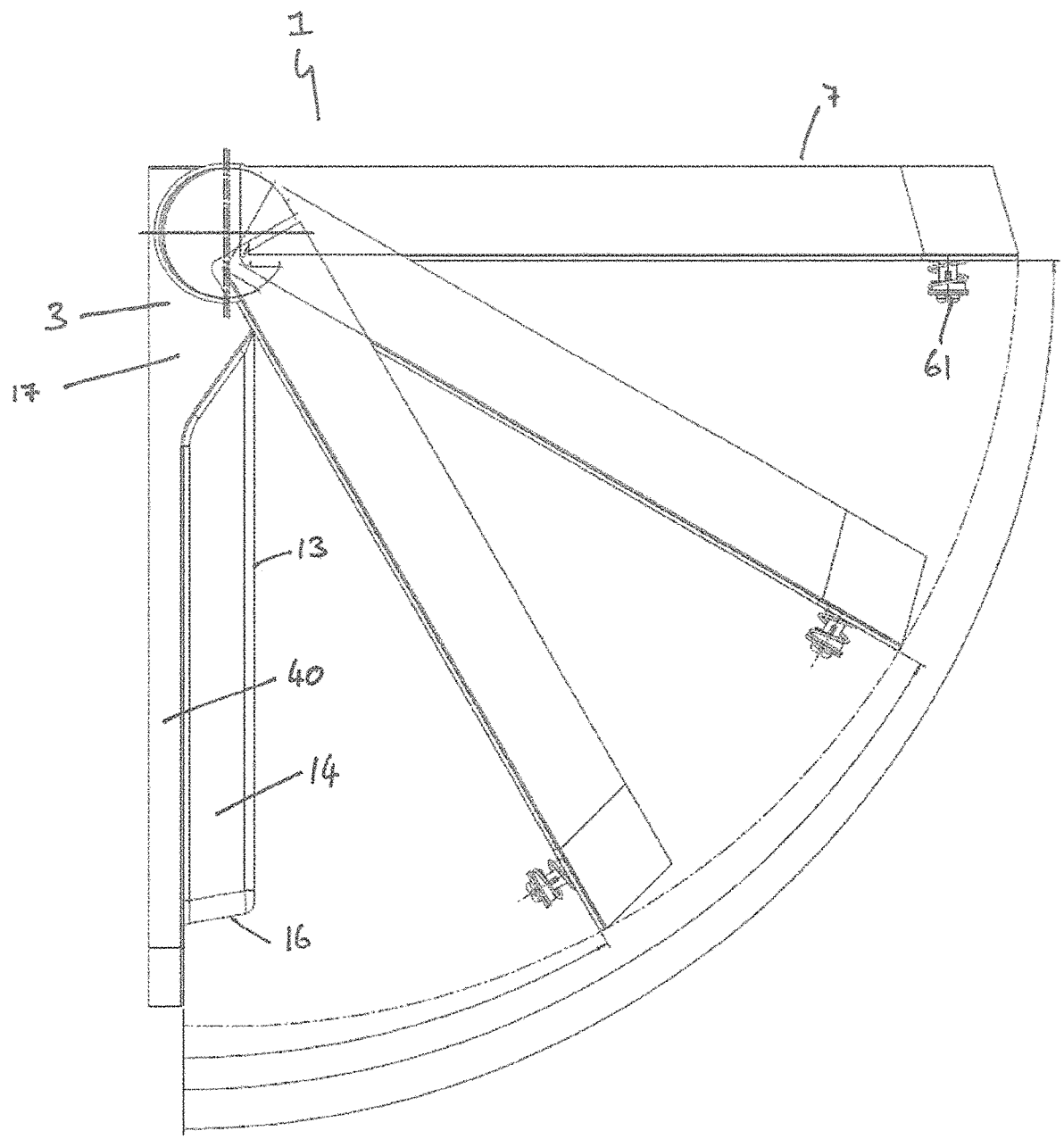
FIG. 6 is a side view of the footrest showing the footrest assuming a plurality of deployed positions.
Figure 7:
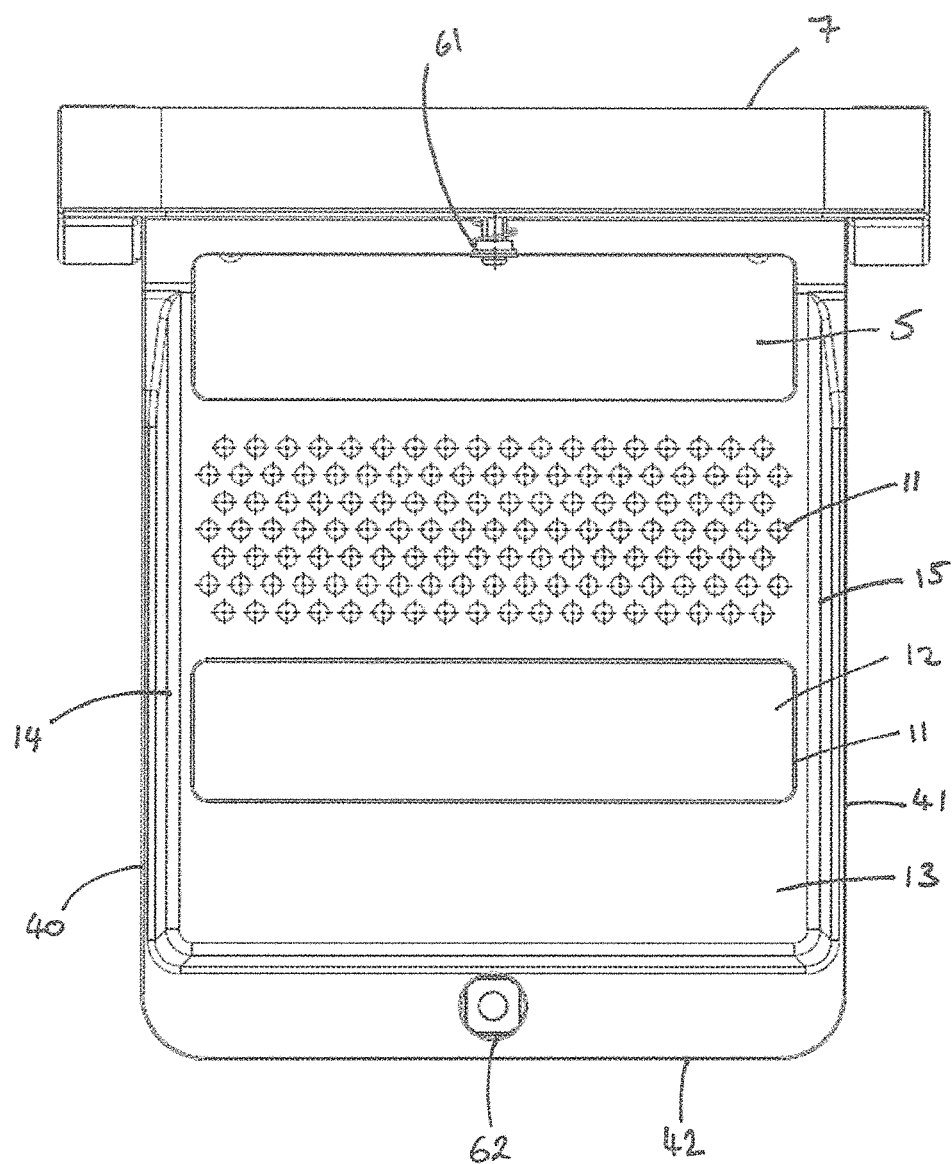
FIG. 7 is a front plan view of the footrest in the deployed state.
Figure 8:
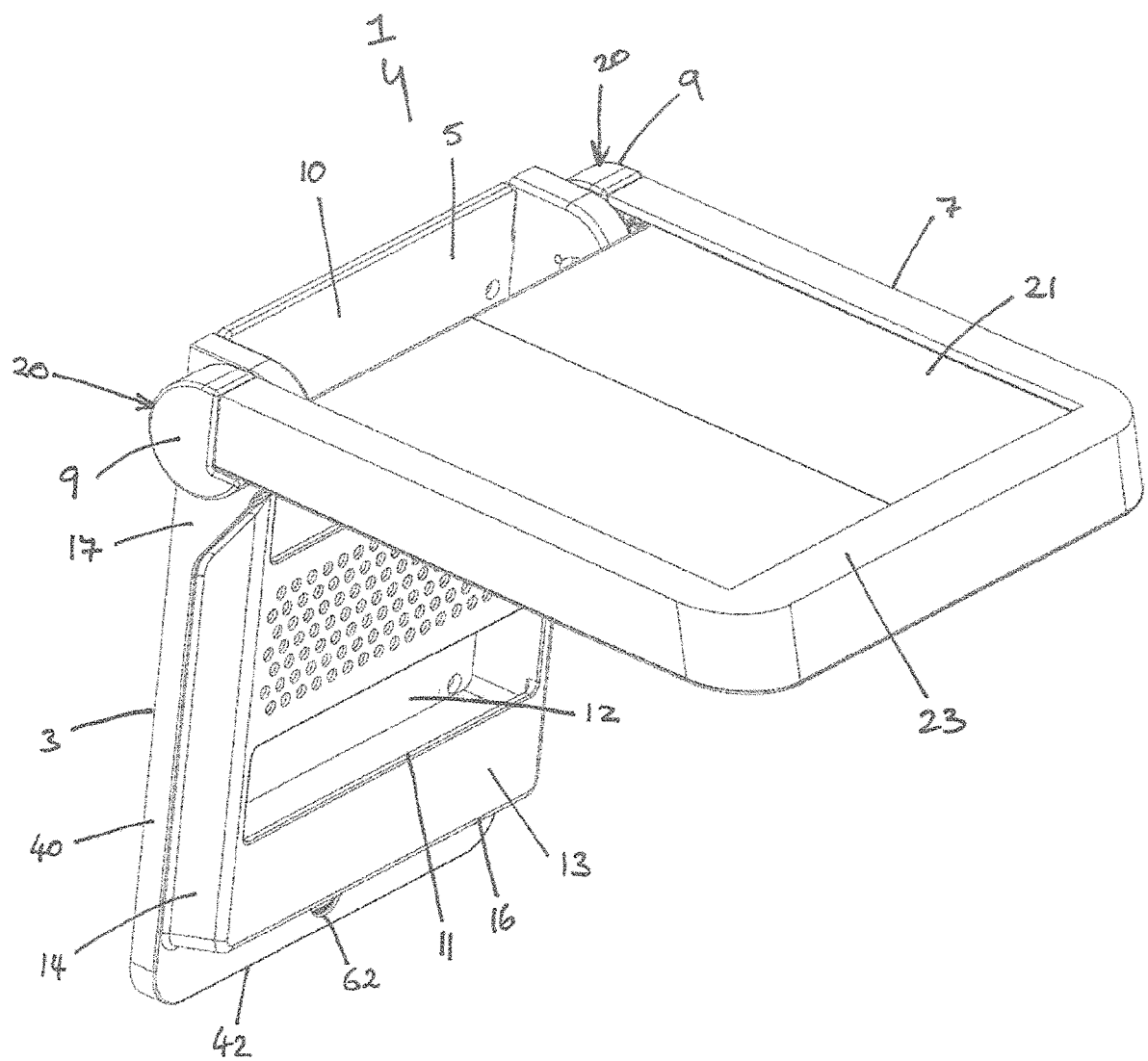
FIG. 8 is a perspective view of the footrest in the deployed state.
Figure 9:
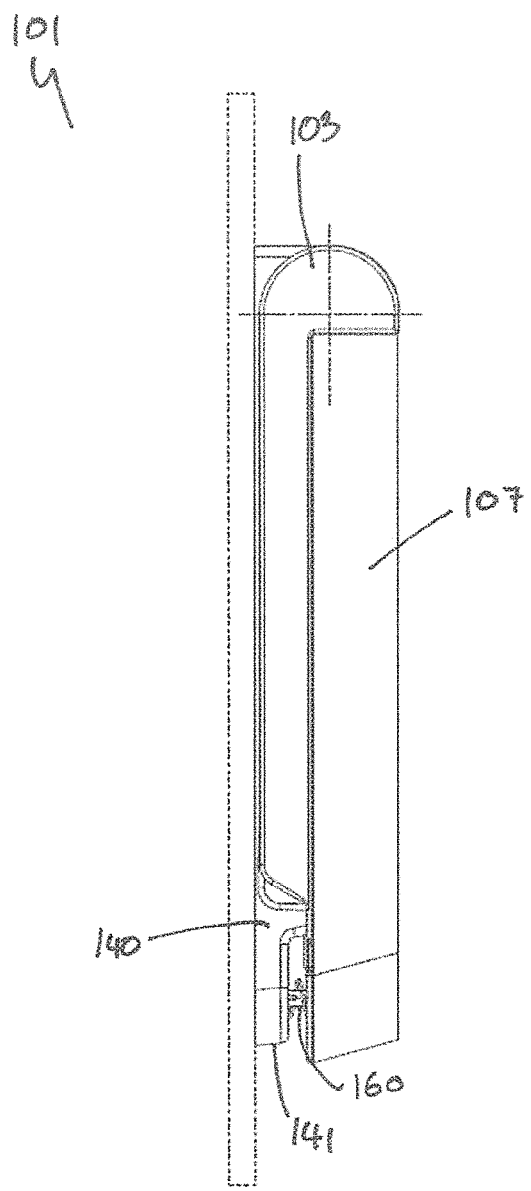
FIG. 9 is a side plan view of a second embodiment of the footrest.
Figure 10:
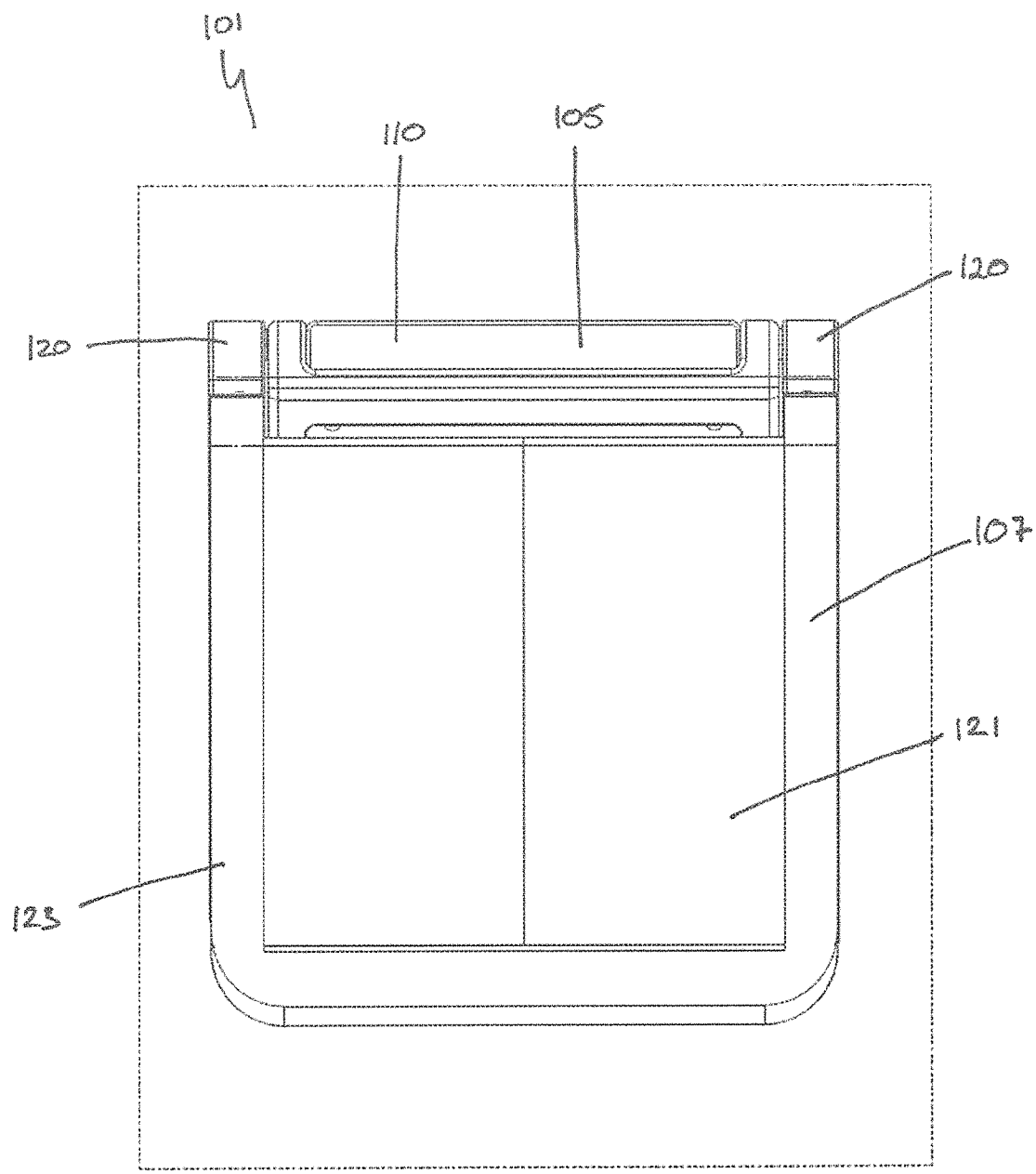
FIG. 10 is a front plan view of the second embodiment of the footrest.

The footrest 1 comprises a support member 3 which is shaped and dimensioned, or otherwise configured, to define a storage compartment 5. In preferred embodiments the storage compartment is of a type commonly referred to as a literature pocket, although it may be used to store a variety of items such as newspapers, magazines, portable electronic devices etc. The footrest 1 further comprises a foot member 7 for supporting one or more feet; in particular those of the occupant of the seating arrangement located rearward the wall as shown in FIG. 13. The foot member 7 is pivotably coupled to the support member 3 such that the foot member 7 is movable between stowed and deployed states as shown in FIGS. 4 and 8 respectively. The footrest 1 further comprises means for releasably retaining the foot member in the deployed state relative to the support member 9. The support member 3 and foot member 7 are arranged such as to provide access to the storage compartment 5 when the foot member 7 adopts either stowed or deployed states. Advantageously when the footrest 1 is supported on a wall in front of a seating arrangement, the seat occupant is able to comfortably rest their feet on the foot member 7 whilst still being able to access in the contents of the storage compartment 5. To this end the support member comprises an aperture 10, serving as an access opening for the compartment 5. The foot member 7 comprises a cut-out, or recessed, portion 22, wherein the aperture 10 and recess 22 coincide to define a channel into the storage compartment 5 when the foot member 7 adopts either stowed or deployed states. In any event, the arrangement is such that the foot member 7 does not prevent access to the contents of the compartment, e.g. by fully or partly blocking the aperture 10, irrespective of whether it is in the stowed state or deployed state. In preferred embodiments the foot member 7 is pivotably coupled to the support member 3 adjacent the aperture 10, the recess 22 being located adjacent the coupling location, overlapping and in register with the aperture 10 thereby exposing the mouth of the storage compartment 5. The recess 22 remains aligned with the aperture 10 through the entire travel of the foot member 7. Typically, the aperture 10 is located at the in-use top of the support member 3.

The support member 3 comprises a body that provides the compartment 5. The body may be a hollow solid body or may comprise a pouch, e.g. formed one or more flexible walls of, for example, netting, leather or fabric. In cases where the body is solid, the aperture 10 is typically permanently open. In embodiments where the body is flexible, the aperture may be openable/closable by the user.

In the illustrated embodiment, the support member 3 comprises front and rear walls 12, 13 and opposing side walls 14, 15 and a bottom wall 16 with the storage compartment 5 being defined therebetween. The support member 3 is typically substantially cuboidal in shape. The support member 3 includes the aperture 10 which is arranged upon the support member 3 such as to provide access to the storage compartment 5 as shown in FIG. 8. To this end the aperture 10 defines an open top of the support member 3 for receiving the paraphernalia into the storage compartment 5. In the first embodiment the side and bottom walls 14, 15, 16 extend from the confines of body of the front wall 12, typically offset from the outward edges of the front wall 12, with the rear wall 13 extending therebetween such that the rear, side and bottom walls 13, 14, 15, 16 are narrower in width than the front wall 12. Ideally, the front wall 12 comprises respective side edges 40, 41 and a bottom edge 42, the side edges 40, 41 having respective upper and lower portions, with each of the respective upper portions protruding further rearward than the lower portions such as to define respective protrusions 17 upon the side edges 40, 41 which extend rearward from the body of the front wall 12. The rear wall 13 may extend between the side walls 14, 15 typically up to the protrusions 17 or it may extend only partially between the side walls 14, 15 such that the rear wall 13 extends to a lower height than the protrusions 17.

In the second embodiment as shown in FIGS. 9 to 12 the side edges 140, 141 may define the side walls 114, 115 of the support member 3. The side walls 14, 15 may be shaped such as to comprise respective upper and lower portions, with the upper portion protruding further rearward than the lower portion such as to define respective protrusions 17 upon side walls 14, 15.

The support member 3 may additionally incorporate one or more additional apertures 11 which are arranged such as to provide further means of entry to the storage compartment 5 and/or to provide means by which the user may view what is currently carried in the storage compartment 5. To this end the one or more additional apertures 11 are typically provided upon the rear wall 13 of the support member 3. It should be understood that in-use the front wall 12 will be supported upon the wall of the vehicle, whilst the rear wall 13 faces towards the occupant of the seating arrangement. Furthermore the bottom wall 16 should be understood as comprising the wall which extends parallel to, nearest to, the floor of the vehicle in which the footrest 1 is disposed in-use.

The foot member 7 is shaped and dimensioned to define the recess 22 which in combination with the aperture 10 is arranged to define the channel into the storage compartment 5 in both stowed and deployed states. The foot member 7 may comprise a single portion however preferably it comprises a central portion 21 and an edge portion 23 which extends around at least part of the periphery of the central portion 21, such as to define a substantially U-shaped edge portion 23. The edge portion 23 is preferably disposed at a greater height relative to the central portion 21. The central portion 21 may be substantially planar and may be made of metal or plastic or a composite material or a combination thereof. In an alternative embodiment (not shown) the central portion 21 may comprise a flexible material such as a mesh or fabric or any suitable flexible material, which is coupled to the edge portion 23, typically to the inner periphery of the edge portion 23. The exterior edges of both the support member 3 and foot member 7 are typically chamfered or rounded to remove the presence of sharp edges which the user might contact when positioning their feet upon the footrest 1 in-use. The edge portion 23 may be made of plastic or rubber or metal or any other suitable material.

The foot member 7 is pivotably coupled to the support member 3 typically by a hinge or other suitable pivotable coupling part 20. The foot member 7 is pivotably coupled to the support member 3, such that the foot member 7 is configured to rotate about a pivot axis defined by the pivotable coupling part 20. Typically, the pivot axis extends perpendicular to the vertical axis and parallel to the front and rear walls 12, 13. In the stowed state the foot member 7 lies substantially parallel, or coplanar, with the support member 3. In the deployed state the foot member 7 is disposed obliquely with respect to the support member 3, at an angle greater than 0° with respect to the support member 3. To this end the foot member 7 is typically configured to pivot between at least 0 and 90° relative to the support member 3, such that at the 90° angle the foot member 7 extends perpendicular to the support member 3.

Figure 1:
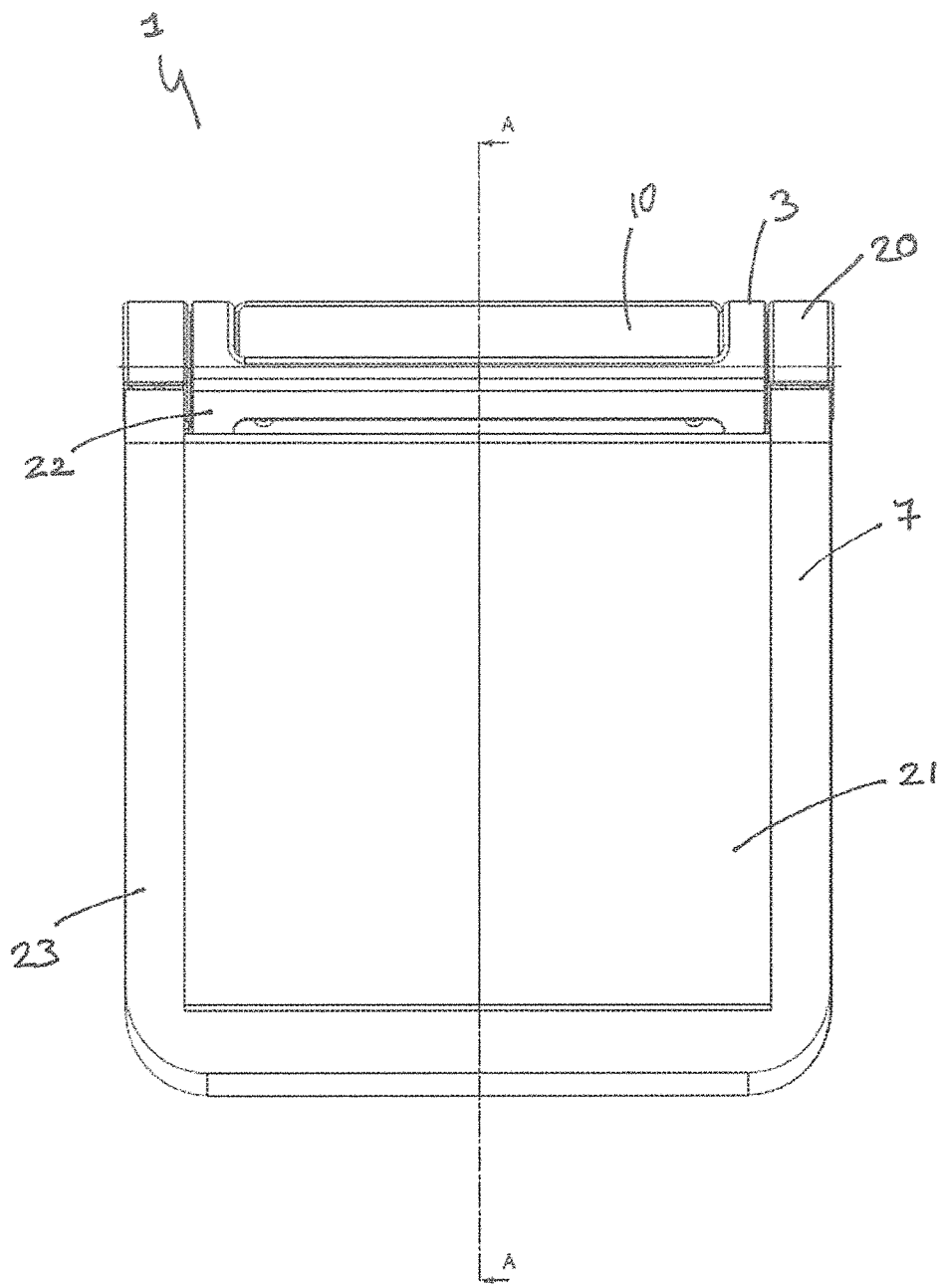
FIG. 1 is a front plan view of a first embodiment of the footrest in a stowed state.
Figure 2:
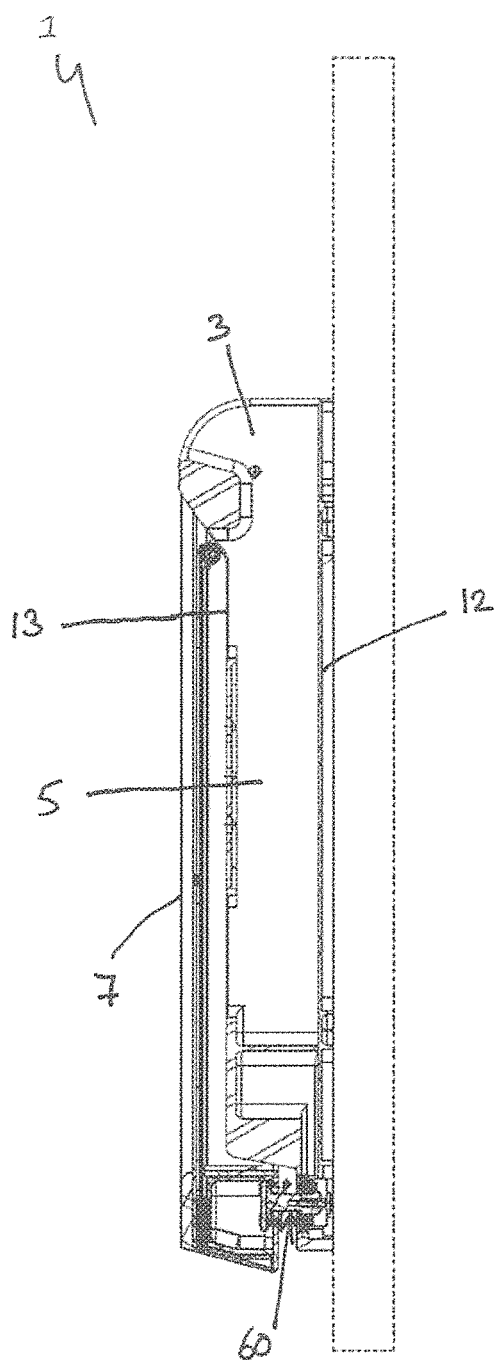
FIG. 2 is a side sectional side view of the footrest in the stowed state.
Figure 3:
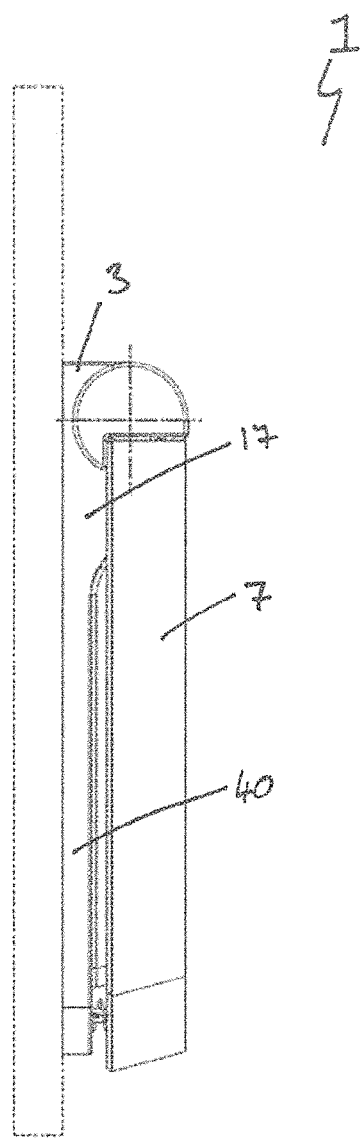
FIG. 3 is a side plan view of the footrest in the stowed state.

The foot member 7 as shown in FIGS. 1 to 13 is typically pivotably coupled to the support member 3 by first and second pivotable coupling parts 20 located at either side of the support member 3, typically upon side edges 40, 41 of the front wall 12 or upon the side walls 14, 15. The recess 22 is defined between the coupling parts 20, typically being bounded by an end of the central portion 21. Preferably, the foot member 7 is pivotably coupled to the support member 3 at exterior faces of the protrusions 16 such that in the deployed state the protrusions extend into the recess 22 whilst in the stowed state the rearward most edge of the foot member 7 is configured to substantially align with the rearward most edge of the support member 3 to define a substantially flush surface as shown in FIGS. 2 and 4. Advantageously, this arrangement provides for a compact arrangement of the footrest 1 in-use.

The means for releasably retaining the support member relative to the foot member 9 is configured such that the foot member 7 can be retained in at least one deployed position, preferably a plurality of deployed positions, having a respective angular displacement relative to the support member 3, when in the deployed state. To this end the means 9 preferably comprises a ratchet mechanism 30. Alternatively the means 9 may comprise any other suitable releasable retaining arrangement. An example of the plurality of deployed positions can be seen in FIG. 6.

In a first embodiment as shown in FIGS. 1 to 8 the means for releasably retaining the support member relative to the foot member 9 comprises the ratchet mechanism 30 which is included within the pivotable coupling part 20 in any conventional manner.

Figure 11:
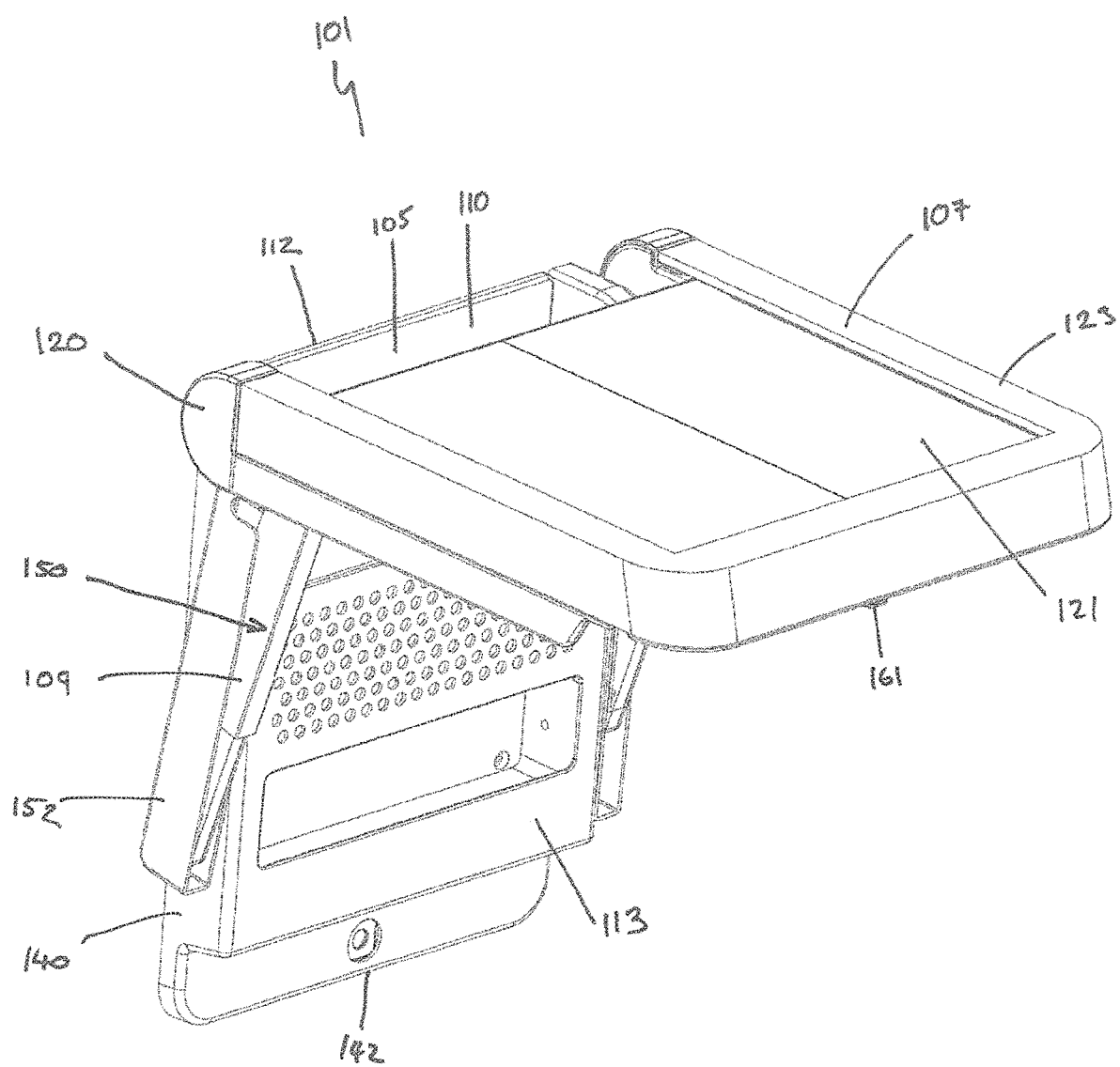
FIG. 11 is a front perspective view of the second embodiment of the footrest in the deployed state.
Figures 12, 12A:
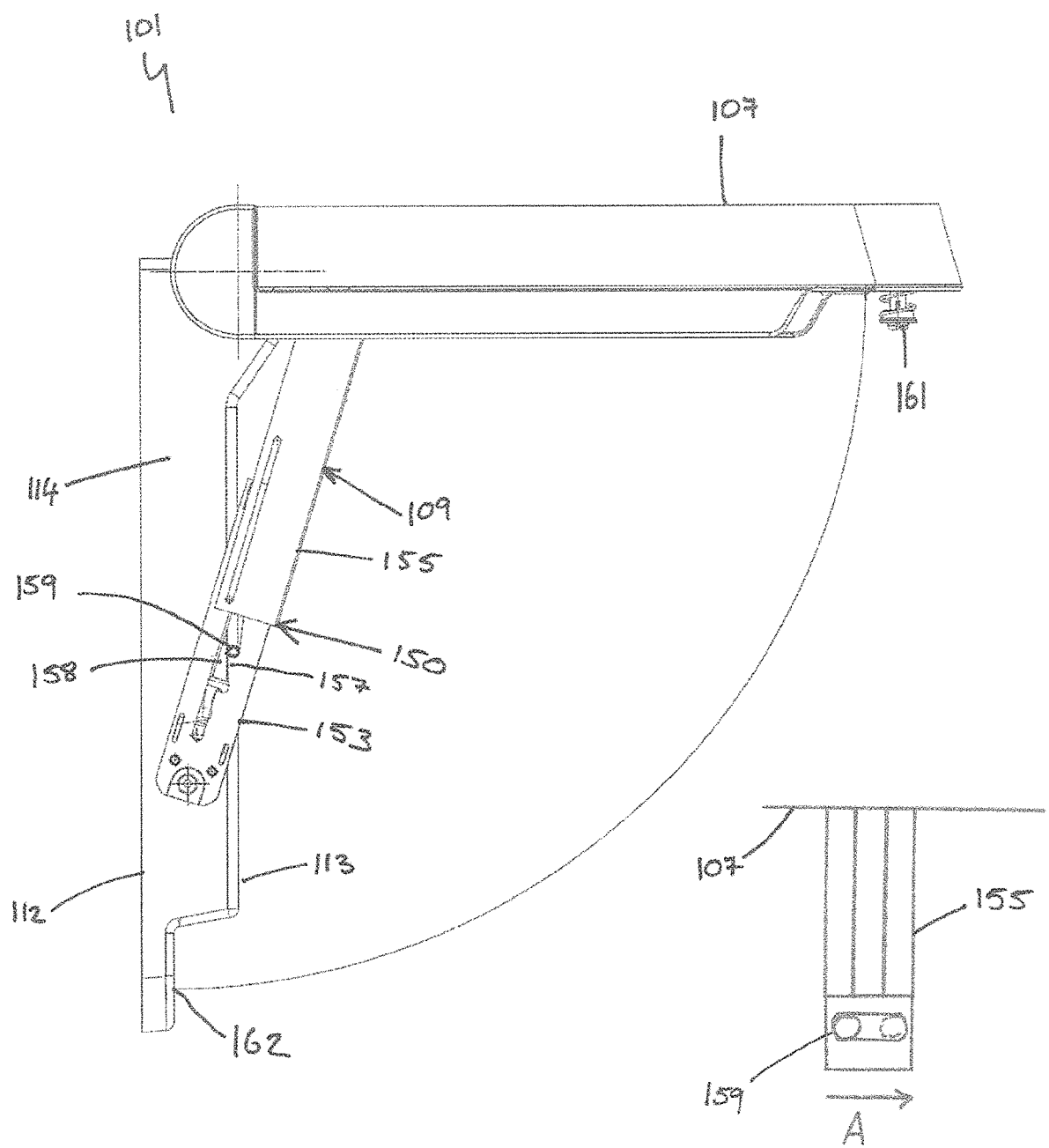
FIG. 12 is a side sectional view of the second embodiment of the footrest in the deployed state.
FIG. 12A is a front plan view of the second portion of the support arm comprising the means for releasably retaining the foot member in the deployed state relative to the support member.

In a second embodiment as shown in FIGS. 9 to 12 the means for releasably retaining the foot member relative to the support member 109 comprises an alternative ratchet mechanism 150 which is configured to releasably retain the foot member 107 in the deployed state (preferably in any one of a plurality of angularly displaced deployment positions) relative to the support member 103. The ratchet mechanism 150 comprises at least one extendable support arm 151 which is pivotably coupled to the support member 103 at one end and the foot member 107 at the opposing end. Ideally, the ratchet mechanism 150 comprises first and second support arms 150 which are disposed at either side of the support member 103, upon the side edges 140, typically towards the lower portion of the side edges 140 as shown in FIGS. 11 and 12. Alternatively the support arms 150 may be coupled to the side walls 114, 115. The support arm(s) 151 comprise first and second elongate portions 153, 155. The support arms 151 may comprise an outer covering 152 for preventing the user from locating any extremities in the movable parts of the footrest 101 whilst also preventing foreign objects from entering the movable parts such as dirt, dust and debris. To this end, the second portion 155 shown in FIG. 12 is contained within a covering 152.

The first portion 153 is pivotably coupled to the support member 103 at one end and releasably coupled to the second portion 155 at at least one location. The first portion 153 is shaped and dimensioned to define a central aperture 158 with the first portion 153 further comprising a plurality of detents 157 which extend from the body of the first portion 153 into the central aperture 158, along one side of the central aperture 158, typically along one of the sides which extends parallel to the front wall 112 in the stowed state. The second portion 155 is coupled to the first portion 153 at one end and the foot member 103 at the opposing end, typically pivotably so. The first portion 153 is shaped and dimensioned to define a cavity within which the second portion 155 is disposed, at least in part, with the second portion 155 being extendable from and retractable into the cavity. The second portion 155 comprises a latch 159 which is disposed within the central aperture 158 of the first portion 153 and extends out of the central aperture 158. The latch 159 is typically provided at a lower end of the second portion 155. The latch 159 is configured to engage any one of the plurality of detents 157 of the first portion 153, to this end the latch 159 is configured to displace relative to the first portion 153 when the second portion 155 is extended relative to the first portion 153. Upon the extension of the second portion 155 relative to the first portion 153, the latch 159 is operable to displace along the length of the central aperture 158 such that the latch 159 may engage with the plurality of detents 157. The latch 159 may comprise a pin or bar or any other suitable member.

Preferably, the latch 159 is movable between an disengaging state and an engaging state as shown in FIG. 12A where the latch 159 is shown in the disengaging state with the arrow A indicating the direction of lateral movement of the latch 159 for assuming the engaging state. To this end the latch 159 comprises resilient biasing means (not shown) such as a spring or other suitable biasing means which is configured to bias the latch 159 towards the engaging state. Advantageously, the detents 157 are configured to vary the latch 159 between the engaging and disengaging states as the second portion 155 is moved relative to the first portion 153. To this end each detent 157 is ideally shaped such as to gradually narrow the width of the central aperture 158 along the length of each detent 157 such that at one point along the length of each detent 157 the width of the central aperture 158 is narrowed to the extent that that the latch 159 may displace alongside the detent 157 only in the disengaging state. To this end the detents 157 typically define a sawtooth edge along the length of one side of the central aperture 158.

In the stowed state the second portion 155 is substantially retracted within the first portion 153, whilst in the deployed state the second portion 155 extends from within the first portion 153, at least in part, with the latch 159 engaging with one of the detents 157. Advantageously the plurality of detents 157 correspond to a plurality of deployed positions with the foot member 107 being retainable at the plurality of deployed positions in the deployed state relative to the support member 103. Alternatively the second portion 155 may be configured to receive the first portion 153 therein, at least in part.

Preferably, the support member 3, 103 and foot member 7, 107 comprise a complementary securing means 60, 160. The securing means 60, 160 is configured to releasably secure the foot member 7, 107 to the support member 3, 103 in the stowed state. The securing means 60, 160 comprises a male member 61, 161 typically comprising a resilient biasing means, provided on the foot member 7,107 which is configured to engage with a female member 62, 162 provided on the support member 7, 107. Typically the female member 62, 162 is disposed upon the rear wall 13, 113 or the front wall 12,112 whilst the male member 61, 161 is disposed upon the underside of the edge portion 23, typically upon lower portions thereof. Alternatively the securing means 60, 160 may comprise cooperating magnets or a latch or any other suitable securing means.

In-use the foot member 7, 107 is secured in the stowed state by the securing means 60, 160 with the user being operable to access the contents of the storage compartment 5, 105 by the channel defined by the recess 22, 122 and the aperture 10, 110 in the stowed state. Displacement by the user of the foot member 7, 107 causes the foot member 7, 107 to pivot relative to the support member 103 such that the foot member 7, 107 adopts the deployed state. The user is operable to pivot the foot member 7, 107 about the pivot axis until they find a deployed position which they would like to retain the foot member 7, 107, wherein the means for releasably retaining the foot member relative to the support member 9, 109 is operable to retain the foot member 7, 107 in one of the deployed positions as defined by the ratchet mechanism 30, 150. Advantageously the user may then support their feet upon the footrest 1, 101 in-use. Whilst in the deployed state the user is also operable to access the contents of the storage compartment 5, 105 by the channel defined by the recess 22, 122 and the aperture 10. When the user no longer wishes to rest their feet on the footrest 1, 101 the foot member 7, 107 can be pivoted about the pivot axis such that securing means 60, 160 secures the foot member 7, 107 relative to the support member 3, 103 with the foot member 7, 107 adopting the stowed state.

In an alternative embodiment (not shown) the footrest 1, 101 may optionally include a release arrangement located upon the support member 3, 103 or foot member 7, 107 which is configured to engage the means for releasably retaining the foot member in the deployed state relative to the support member 9, 109 such that the foot member 7, 107 is movable from the deployed state to the stowed state. The release arrangement may comprise a lever which is coupled to the means 9, 109 by a cable arrangement.

The invention is not limited to the embodiment(s) described herein but can be amended or modified without departing from the scope of the present invention.

What is claimed is:

1. A footrest for a bulkhead of a vehicle, the footrest comprising:
    a support member comprising a storage compartment;
    a foot member, wherein the foot member is pivotably coupled to the support member such that the foot member is movable between stowed and deployed states relative to the support member; and
    a ratchet mechanism for releasably retaining the foot member in any one of a plurality of deployed positions relative to the support member;
    wherein the ratchet mechanism comprises at least one support arm which is pivotably coupled to the support member at one end and the foot member at an opposing end.

2. The footrest as claimed in claim 1, wherein the support member and foot member are arranged to provide access to the storage compartment when the foot member adopts the stowed state or the deployed state.

3. The footrest as claimed in claim 2, wherein the support member comprises an aperture and the foot member comprises a recess, wherein the aperture and the recess are arranged to define a channel into the storage compartment when the foot member adopts the stowed state or the deployed state.

4. The footrest as claimed in claim 1, wherein the foot member is pivotably coupled to the support member by first and second pivotable coupling parts located at either side of the support member.

5. The footrest as claimed in claim 1, wherein the ratchet mechanism is incorporated within a pivotable coupling part.

6. The footrest as claimed in claim 1, wherein the at least one support arm comprises first and second elongate portions, wherein the first elongate portion is pivotably coupled to the support member at one end and releasably coupled to the second elongate portion at at least one location.

7. The footrest as claimed in claim 6, wherein the first elongate portion is shaped and dimensioned to define a central aperture with the first elongate portion further comprising a plurality of detents which extend from a body of the first elongate portion into the central aperture, along one side of the central aperture.

8. The footrest as claimed in claim 7, wherein the plurality of detents define a sawtooth edge substantially along a length of one side of the central aperture.

9. The footrest as claimed in claim 7, wherein the second elongate portion comprises a latch which is configured to engage the plurality of detents of the first elongate portion when the second elongate portion is extended relative to the first elongate portion.

10. The footrest as claimed in claim 6, wherein the second elongate portion is coupled to the first elongate portion at one end and the foot member at an opposing end, wherein the first elongate portion is shaped and dimensioned to define a cavity within which the second elongate portion is disposed, at least in part, with the second elongate portion being extendable from and retractable into the cavity.

11. The footrest as claimed in claim 1, wherein said foot member comprises a central portion and an edge portion.

12. The footrest as claimed in claim 11, wherein said central portion comprises a mesh material.

13. The footrest as claimed in claim 1, wherein said support member incorporates one or more additional apertures for providing further means of entry to the storage compartment or one or more viewpoints.

14. The footrest as claimed in claim 1, wherein said footrest comprises securing means which is configured to releasably secure the foot member to the support member in the stowed state.

15. The footrest as claimed in claim 14, wherein the securing means comprises a male member provided on the foot member and a female member which is provided on the support member.

16. The footrest as claimed in claim 1, wherein a mouth of the storage compartment is located at an in-use top of the support member.

17. The footrest as claimed in claim 16, wherein the foot member is at least one of:
   pivotably coupled to the support member at one or more sides of the support member; or
   pivotably coupled to the support member adjacent an aperture in the support member, the support member having a recessed portion in register with the aperture to expose the mouth of the storage compartment.

18. A seating installation comprising at least one seat facing a bulkhead, wherein a footrest as claimed in claim 1 is fixed to the bulkhead in front of said at least one seat.

19. A footrest for a bulkhead of a vehicle, the footrest comprising:
   a support member comprising a storage compartment;
   a foot member, wherein the foot member is pivotably coupled to the support member such that the foot member is movable between stowed and deployed states relative to the support member; and
   means for releasably retaining the foot member in the deployed state relative to the support member;
   wherein:
      the support member comprises front and rear walls and opposing side walls and a bottom wall with the storage compartment being defined therebetween, such that the support member is typically substantially cuboidal in shape; and
      the side and bottom walls extend from confines of a body of the front wall, offset from edges of the front wall with the rear wall extending between the side and bottom walls such that the rear, side and bottom walls are narrower in width than the front wall.

20. The footrest as claimed in claim 19, wherein the front wall comprises side edges and a bottom edge, the side edges having respective upper and lower portions, with each of the respective upper portions protruding further rearward than the respective lower portions such as to define respective protrusions upon the side edges which extend rearward from the body of the front wall.

* * * * *